United States Patent [19]

Akimoto et al.

[11] Patent Number: 5,710,949
[45] Date of Patent: Jan. 20, 1998

[54] LENS DRIVING DEVICE

[75] Inventors: Kazuo Akimoto; Miyoshi Tanikawa; Hiroki Kusumi, all of Yotsukaido, Japan

[73] Assignee: SEIKO Precision Inc., Japan

[21] Appl. No.: 527,787

[22] Filed: Sep. 13, 1995

[30] Foreign Application Priority Data

Sep. 13, 1994 [JP] Japan .................. 6-218860

[51] Int. Cl.$^6$ .................. G03B 9/08; G03B 3/00
[52] U.S. Cl. .................. 396/132; 396/463
[58] Field of Search .................. 354/195.1, 400, 354/234.1, 266, 439; 396/132, 463, 133, 221, 256

[56] References Cited

U.S. PATENT DOCUMENTS

| | | | |
|---|---|---|---|
| 4,217,049 | 8/1980 | Kitai et al. | 354/195 |
| 4,881,096 | 11/1989 | Ogihara et al. | 354/400 |
| 4,974,006 | 11/1990 | Shinozaki et al. | 354/400 |
| 5,111,230 | 5/1992 | Kobayashi | 354/400 |

*Primary Examiner*—Eddie C. Lee
*Attorney, Agent, or Firm*—Adams & Wilks

[57] ABSTRACT

A lens driving device for controlling the position of a lens setting member according to a distance to an object to be photographed has a lens barrel mounted to undergo movement in the direction of an optical axis, a lens setting member mounted to undergo rotation about the lens barrel and to move the lens barrel in the direction of the optical axis, a biasing spring for applying a biasing force for biasing the lens setting member in one direction, a ratchet engaging with the lens setting member to undergo rotation therewith, a retaining member having a pair of engaging pawls disposed to alternately engage with the ratchet to prevent rotation of the ratchet due to the biasing force of the biasing spring, an electromagnetic actuator for applying a first driving voltage for maintaining the retaining member in an engaged state and a second driving voltage for rocking the retaining member to alternately engage the pawls with the ratchet to cause the biasing spring to rotate the ratchet in a stepwise manner during periods when the ratchet is not engaged by either of the engaging pawls of the retaining member, and a driving ring for driving the lens barrel to return to an initial position by rotating the lens setting member to an initial position against the biasing force of the biasing spring and for performing at least one of an exposure operation and an aperture control operation. In the lens driving device, the first driving voltage of the electromagnetic actuator is lower than the second driving voltage such that a lower voltage is applied when the driving member is rotated and the lens setting member is at rest than when the lens setting member is not at rest.

7 Claims, 7 Drawing Sheets

LENS DRIVING DEVICE

BACKGROUND OF THE INVENTION

1. Field of the Invention

The present invention relates to a lens driving device for use in an autofocus camera.

2. Description of the Related Art

A lens driving device equipped with an electromagnetic actuator has been proposed in Japanese Patent Publication No. 70135/1993. This lens driving device comprises a lens driving ring which is biased in one of two directions by a ring biasing means. The lens driving ring is equipped with a circumferential ratchet. A detent or retaining member having a pair of pawls is pivotally mounted outside the lens driving ring. Selected one of the pawls engages with the ratchet to arrest rotation of the lens driving ring against the action of the ring biasing means. The detent member is rocked to bring the engaging pawls alternately into engagement with the ratchet. The electromagnetic actuator permits the ring biasing means to rotate the lens driving ring in steps.

In the prior art technique, the voltage applied to the electromagnetic actuator for rocking a detent member is kept constant, whether a lens setting member is rotated or kept stationary. When the driving member is rotated, it is necessary to apply a maximum voltage in order to rotate the driving member and simultaneously to maintain the lens setting member stationary. Therefore, the voltage applied to the circuit has a high peak. Consequently, it has been difficult to reduce the amount of electric power consumed.

SUMMARY OF THE INVENTION

Accordingly, it is an object of the present invention to provide a lens driving device whose construction is based on the structure described above but which is characterized in that the voltage applied to the circuit has a lower peak.

The above object is achieved in accordance with the teachings of the present invention by a lens driving device having a lens barrel capable of moving in a direction of an optical axis, a lens setting member capable of rotating about said lens barrel and acting to rotate said lens barrel in the direction of the optical axis, and a biasing means for biasing said lens setting member in one direction, the lens driving device being adapted to control a position of said lens setting member according to a distance to a subject, said lens driving device comprising: a ratchet engaging with said lens setting member and being rotated by said lens setting member when the lens setting member rotates, said ratchet being provided with a plurality of teeth on its outer surface; a detent member having a pair of engaging pawls which alternately engage with said ratchet to arrest rotation of said ratchet against a biasing force of said biasing means; an electromagnetic actuator for rocking said detent member so that said engaging pawls are alternately brought into engagement with the teeth of said ratchet, thus permitting the biasing means to rotate said ratchet in steps; and a driving member acting to perform a lens initial position returning operation for rotating said lens setting member into its initial position against the biasing force of said biasing means and to perform an exposure operation or an aperture control operation outside range of operation of said lens setting member. When said driving member is rotated and said lens setting member is at rest, a voltage applied to said electromagnetic actuator is set lower than a voltage applied when said lens setting member is rotated and higher than a voltage applied when said detent member can be brought into engagement with said ratchet against the biasing force of said biasing means.

That is, when the lens setting member is at rest, the voltage applied to the electromagnetic actuator is set to a lower value.

DESCRIPTION OF THE PREFERRED EMBODIMENTS

Figure 1:
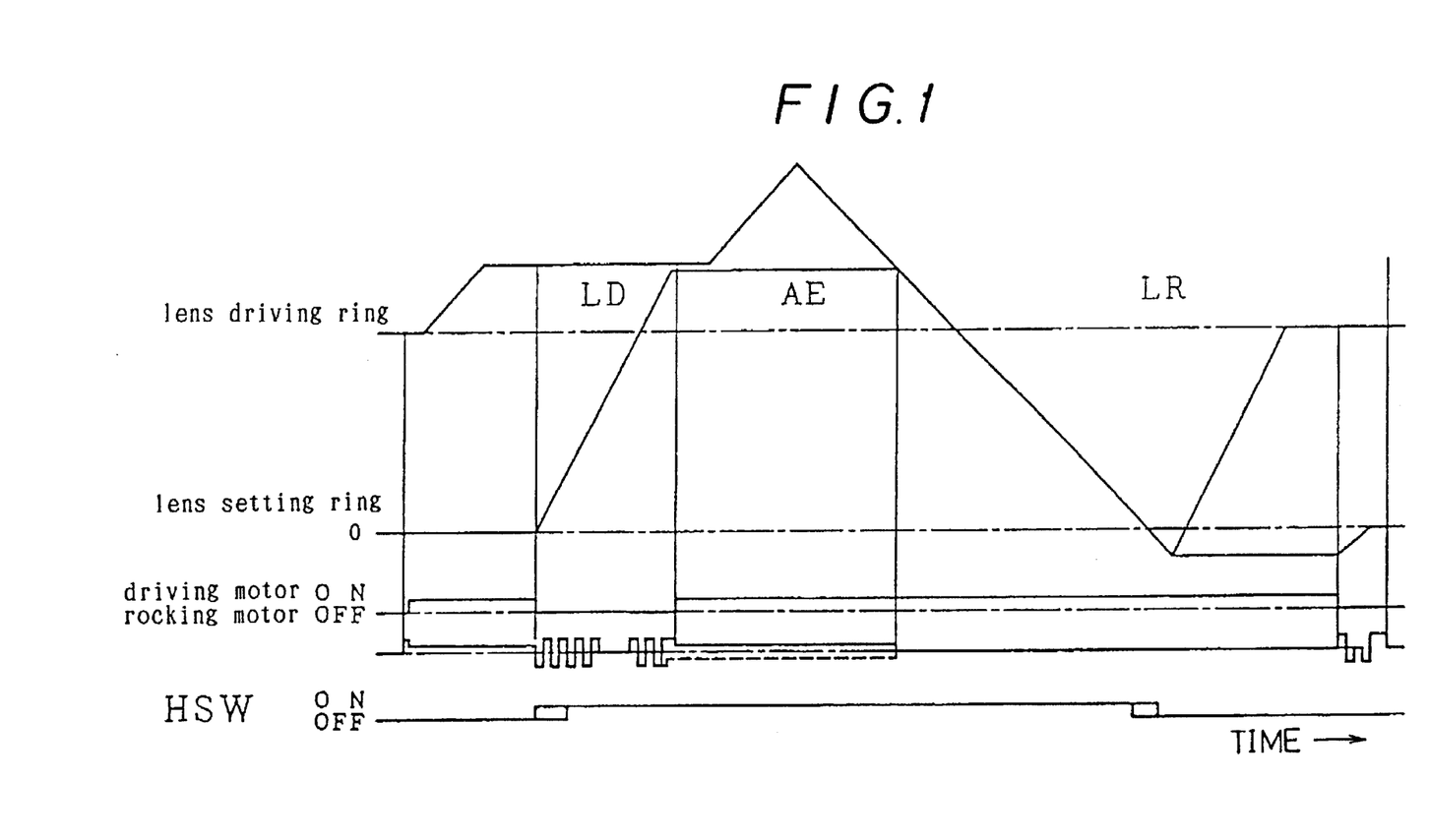
FIG. 1 is a diagram illustrating a sequence of operations of a lens driving device according to the present invention.
Figure 2:
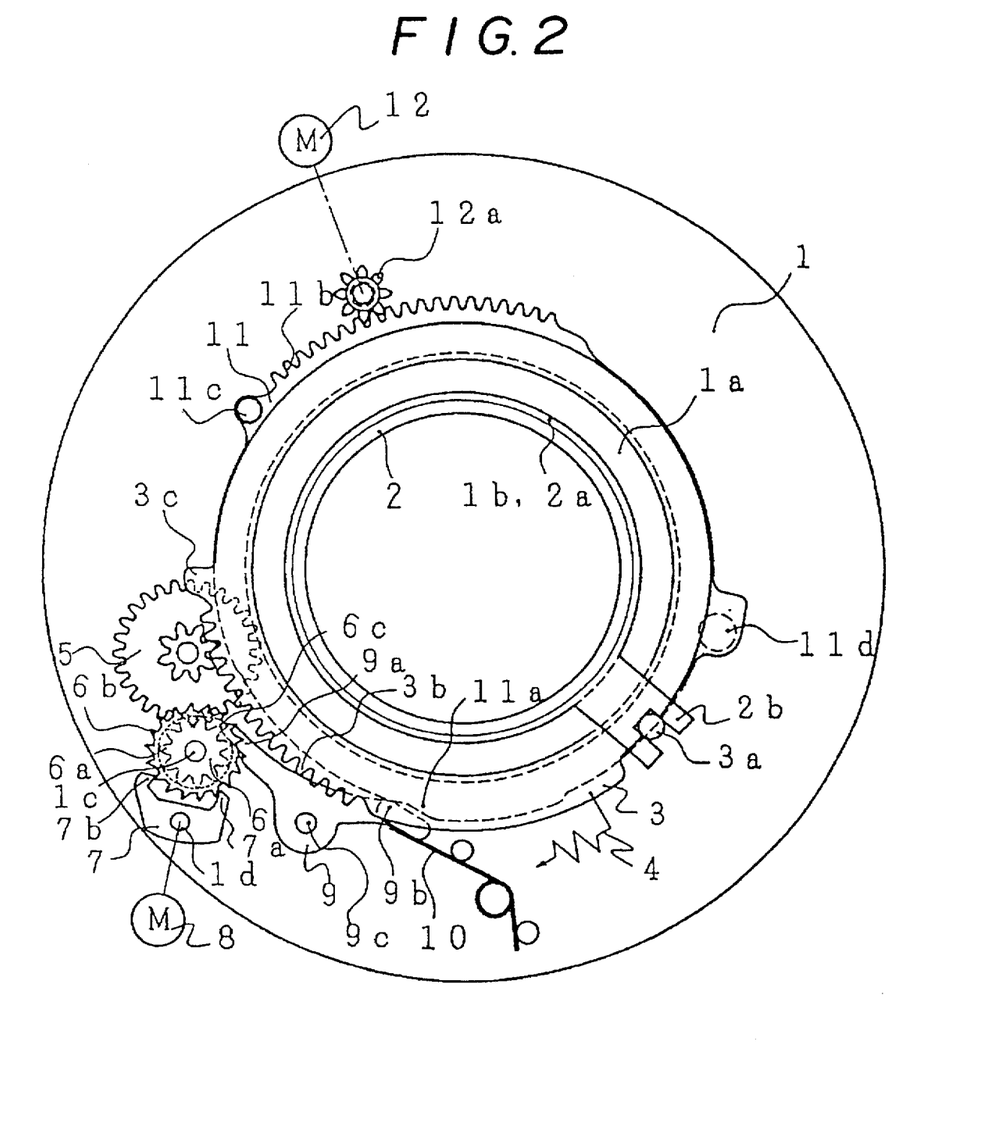
FIG. 2 is a front elevation of the lens driving device whose condition is the initial condition.
Figure 3:
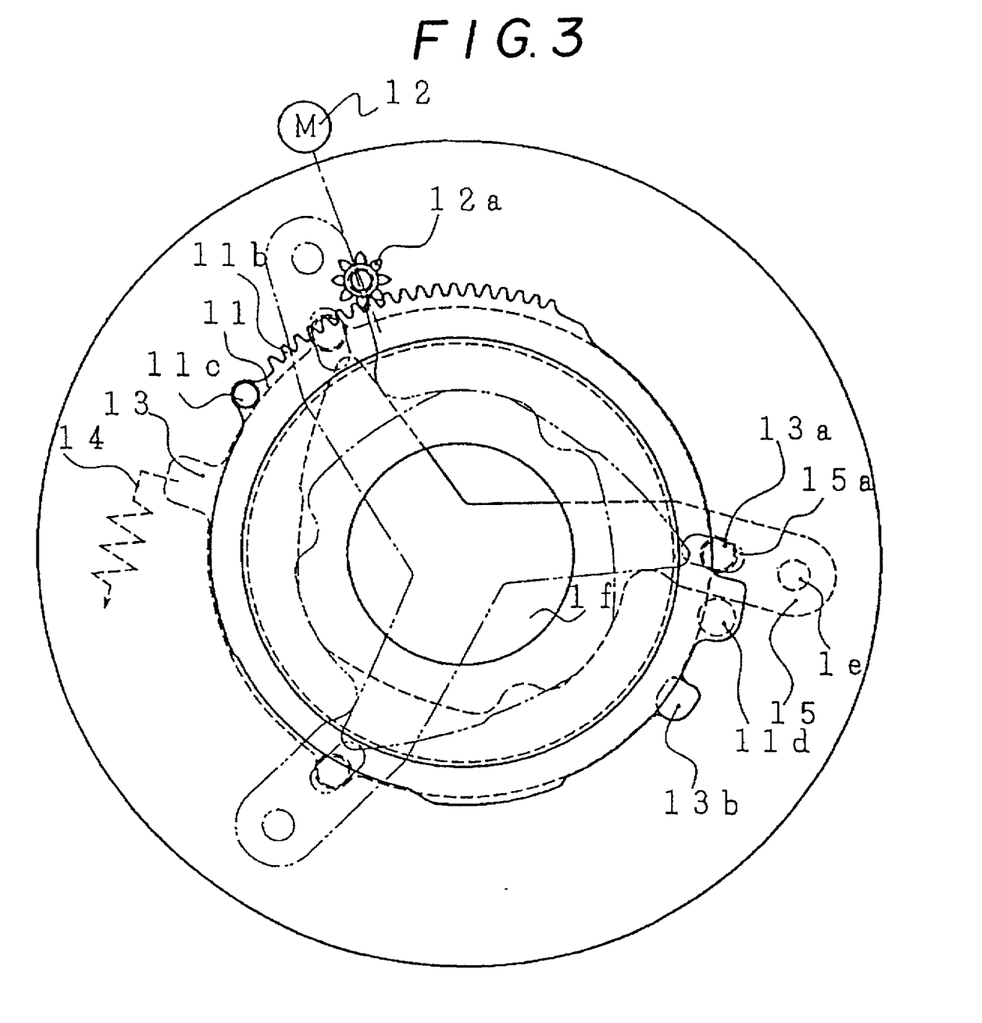
FIG. 3 is a front elevation of the open-and-close mechanism of the lens driving device shown in FIG. 2.
Figure 4:
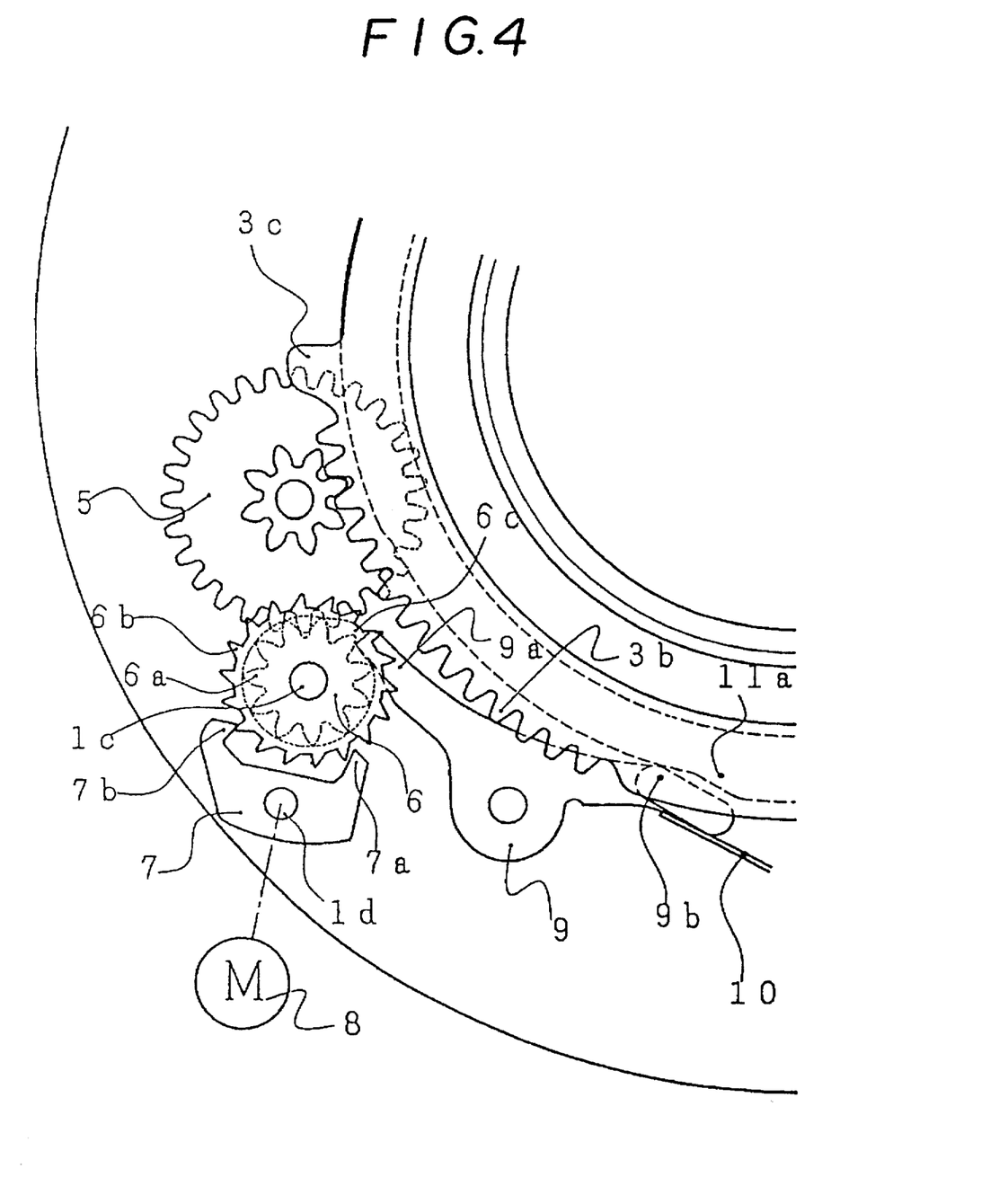
FIG. 4 is an enlarged view of the lens driving portion of the lens driving device shown in FIG. 2.

The preferred embodiments of the invention are hereinafter described in detail by referring to the accompanying drawings. FIG. 1 is a diagram illustrating a sequence of operations of a shutter (described later). In FIGS. 2, 3, and 4, a shutter base plate 1 has a lens barrel support member 1a for holding a lens barrel 2. The support member 1a has an internal female helicoid 1b. The lens barrel 2 is provided with a male helicoid 2a which is mated with the female helicoid 1b. Therefore, when the lens barrel 2 is rotated as described later, it is moved along the optical axis. This shifts the focus of the lens.

A lens setting member or ring 3 is rotatably fitted over the outer periphery of the lens barrel support member 1a to rotate the lens barrel 2. The setting ring 3 has a protruding portion 3a which is in engagement with the engaging portion 2b of the lens barrel 2. The lens barrel 2 is coupled to the lens setting ring 3 and rotated with the lens setting ring 3, which is biased in a clockwise direction by a spring 4.

The lens setting ring 3 has teeth 3b on its outer surface and is connected via an idler wheel 5 with a gear 6a of a ratchet 6. This ratchet 6 rotates about a shaft 1c extending through the shutter base plate 1. The outer surface of the ratchet 6 is provided with a plurality of teeth 6b which are regularly spaced from each other. An anchor 7 or retaining member swings about a shaft 1d extending through the shutter base plate 1 and has a pair of engaging pawls 7a and 7b. These pawls 7a and 7b alternately engage with the teeth 6b of the ratchet 6. The position at which one engaging pawl 7a engages with each tooth 6b of the ratchet 6 is shifted in phase with respect to the position at which the other pawl 7b engages with each tooth 6b by half of the pitch between the successive teeth 6b. Therefore, if the anchor 7 rotates from a position at which one engaging pawl 7a is in engagement with the teeth 6b of the ratchet 6 to a position at which the other engaging pawl 7b is in engagement with the teeth 6b, the ratchet 6 is rotated through an angle equal to half of the pitch between the successive teeth 6b by the biasing force of the spring 4 via the idler wheel 5. In order to rock this anchor 7, a rocking motor 8 which is rotatable forwardly and reversaly is connected to the anchor 7.

Figure 5:
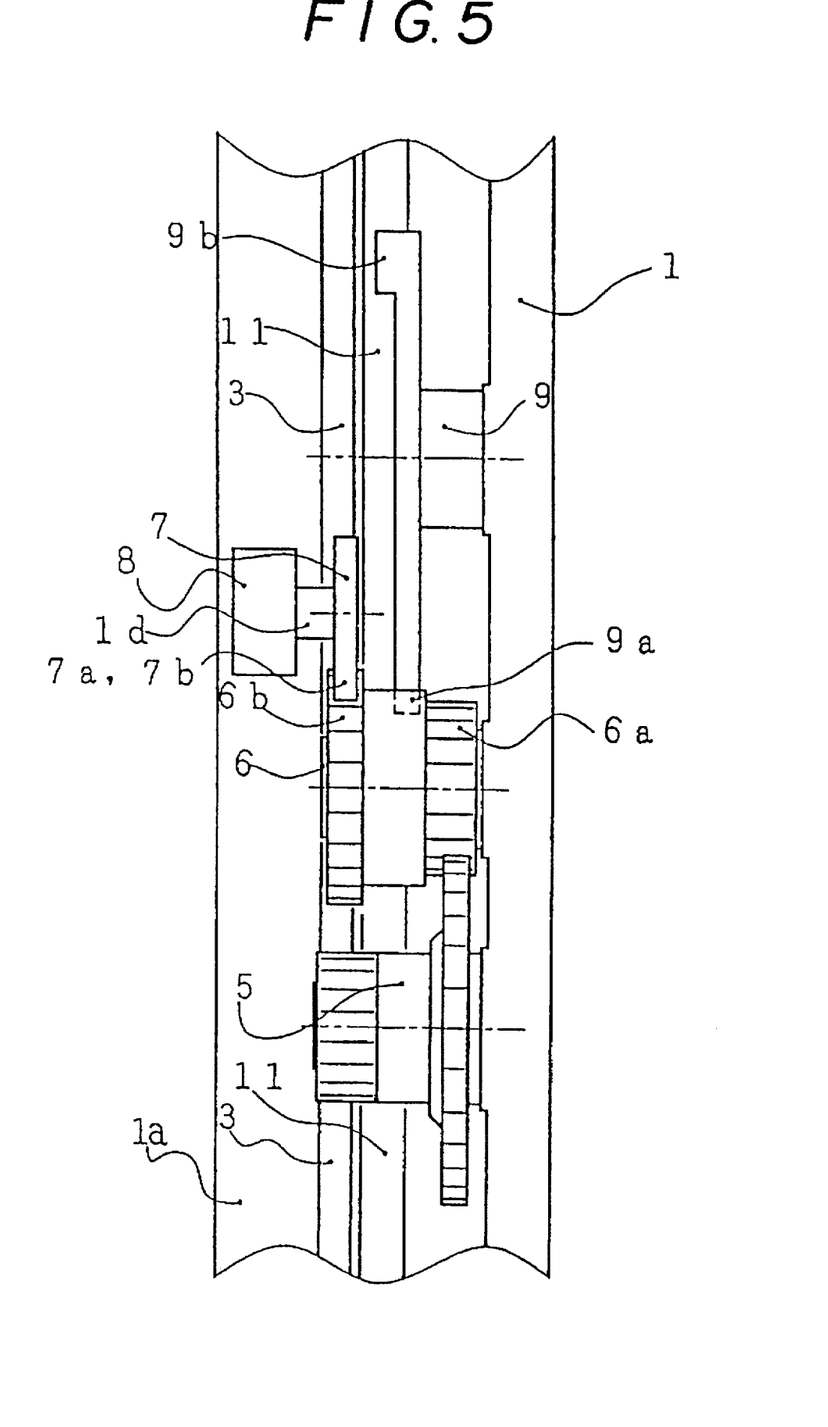
FIG. 5 is a fragmentary side elevation of the lens driving portion shown in FIG. 4.
Figure 7:
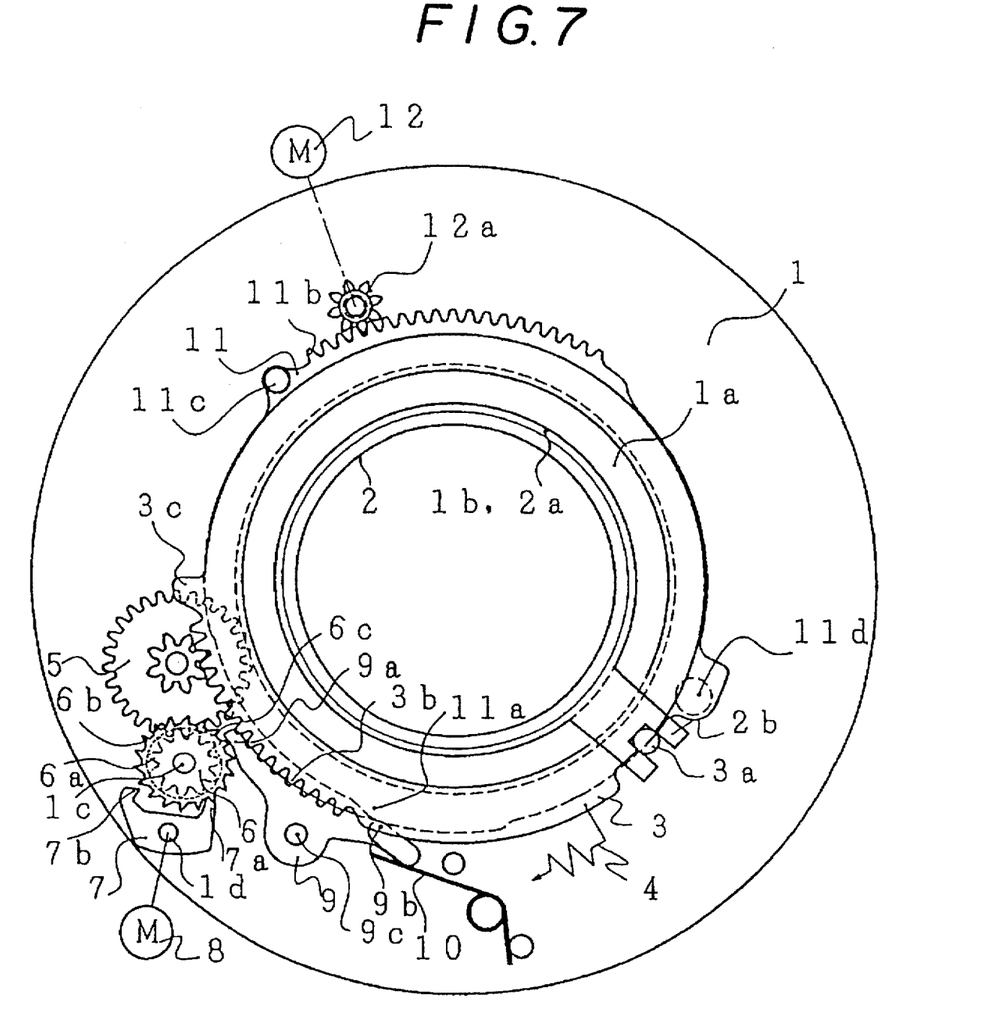
FIG. 7 is a front elevation of the lens driving device which is in an operating state.

In FIGS. 4 and 5, the ratchet 6 is provided with the gear 6a, the teeth 6b, and an engaged portion 6c. In the initial condition shown in FIG. 2, the engaging portion 9a of an engaging lever 9 engages with the engaged portion 6c, thus arresting the ratchet 6. The engaging portion 9a or one end, of the engaging lever 9 is biased into engagement with the engaged portion 6c of the ratchet 6 by a spring 10. In FIG. 7, when a driving ring 11 turns in a clockwise direction, the other end 9b of the lever 9 is pushed by the cam portion 11a of the driving ring 11 and rotated about a shaft 9c, thus disengaging the end 9a from the engaged portion 6c. The driving ring 11 is rotatably fitted over the outer surface of the lens barrel support member 1a of the shutter base plate 1. The driving ring 11 has teeth 11b that mesh with a gear 12a connected to a driving motor 12, so that the driving ring 11 can rotate forwardly and rearwardly. A pin 11c is firmly mounted to the driving ring 11 and engages with an engaging portion 3c of the lens setting ring 3. The pin 11c acts to rotate the setting ring 3 in a counterclockwise direction against the biasing force of the spring 4.

Figure 6:
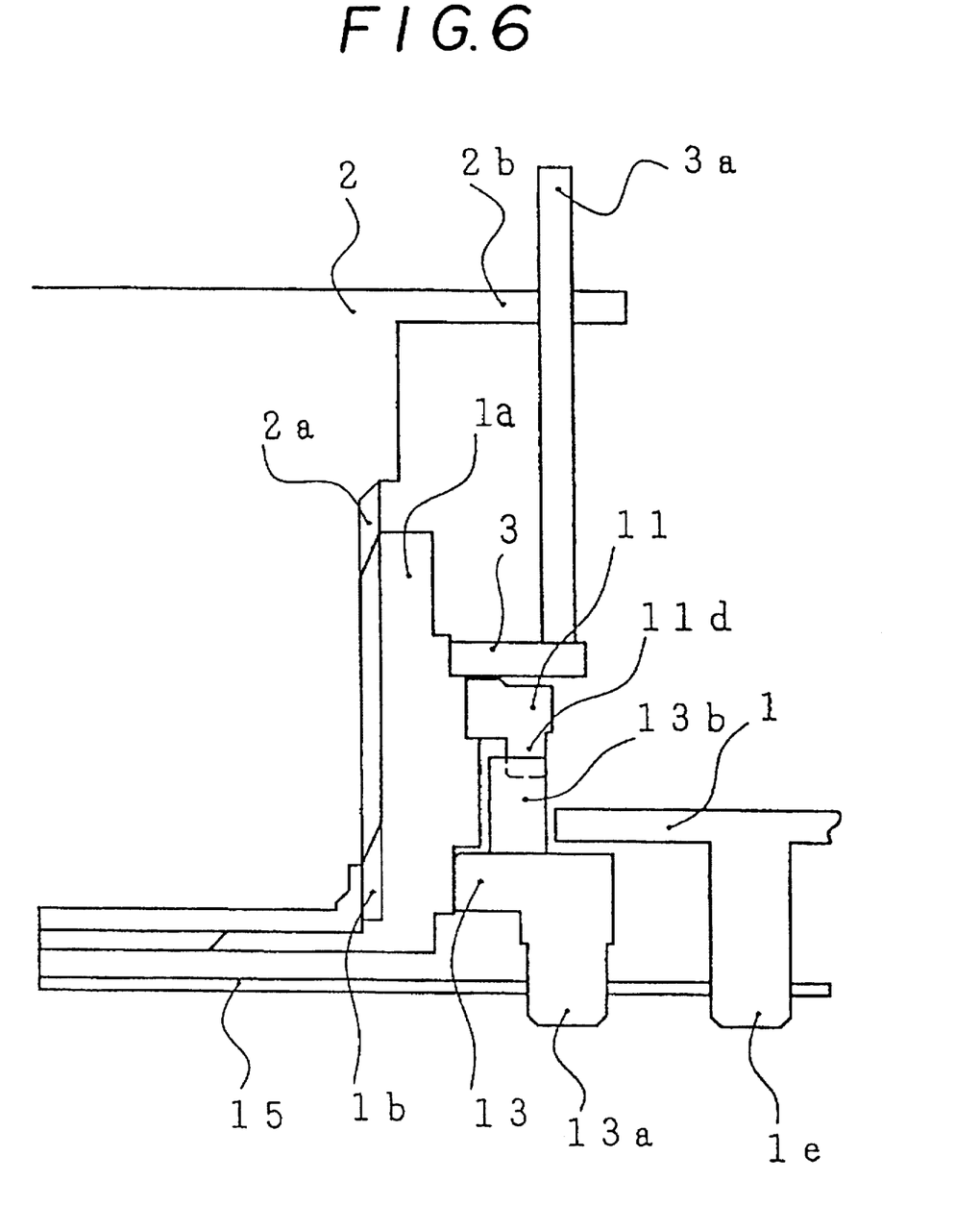
FIG. 6 is a cross-sectional view of the lens driving device according to the invention.

FIG. 3 shows a sector control portion mounted on the side of the bottom surface of the shutter base plate 1 shown in FIG. 2. And FIG. 6 shows a relationship of the lens setting ring 3, the base plate 1 and a sector ring 13. The sector ring 13 is rotatably fitted over the outer surface of the lens barrel support member 1a of the shutter base plate 1. The sector ring 13 is biased in a counterclockwise direction by a spring 14. A sector 15 is provided with a slot 15a in which a pin 13a rigidly affixed to the sector ring 13 is fitted. When the sector ring 13 rotates, the sector 15 rotates about a fixed shaft 1e mounted to the shutter base plate 1. The sector ring 13 has an engaging portion 13b capable of engaging with a pin 11d securely mounted to the driving ring 11. When the driving ring 11 rotates clockwise, the sector ring 13 is rotated against the force of the spring 14.

The operation of the structure described above is next described. Under the condition shown in FIG. 2, if the shutter button (not shown) is depressed, the rocking motor 8 is first electrically energized. This brings the engaging pawl 7b of the anchor 7 into engagement with one of the teeth 6b of the ratchet 6. The ratchet 6 is brought to a stop in the illustrated state. Then, the driving motor 12 is energized to rotate the driving ring 11 in a clockwise direction. The cam portion 11a of the ring 1 i rotates the engaging lever 9 against the biasing force of the spring 10 until the pin 11d comes into contact with the engaging portion 13b of the sector ring 13, whereupon the driving ring 11 is halted. Under this condition, the lens setting ring 3 is locked against the biasing force of the spring 4 because the anchor 7 arrests the ratchet 6. If the rocking motor 8 is subsequently energized, the anchor 7 is rotated in a counterclockwise direction. This disengages the engaging pawl 7b of the anchor 7 from the tooth 6b of the ratchet 6. Then, the other engaging pawl 7a comes into engagement with the next tooth 6b. Because of the operations described thus far, the lens setting ring 3 and the ratchet 6 are rotated through an angle equal to half of the pitch between the successive teeth 6b by the biasing force of the spring 4. When the rocking motor 8 is energized so as to swing the anchor 7 in the reverse direction, the lens setting ring 3 and the ratchet 6 rotate, in the same way as in the above-described operation. In order to rotate the ring 3 into the desired position, the swinging motion of the anchor 7 is repeated a corresponding number of times. When the lens setting ring 3 reaches the given focal point, the rocking motor 8 is energized so that the tooth 6b is kept engaged by the engaging pawl 7a or 7b. However, the voltage applied for this energization is lower than the voltage applied to rock the anchor 7. The former voltage is only that required to maintain engagement of the tooth 6b with the pawl 7a or 7b.

After the lens setting ring 3 reaches the given position, the driving ring 11 rotates further clockwise. The engaging portion 13b of the sector ring 13 is pushed and rotated by the pin 11d securely mounted to the driving ring 11. Then, the pin 13a affixed to the rotating sector ring 13 rotates the sector 15 about the shaft 1e, thus opening the lens aperture 1f. Thus, an exposure operation is performed. When a desired amount of exposure is reached, the driving ring 11 is rotated in a counterclockwise direction. Concomitantly, the sector ring 13 and the sector 15 are rotated in their respective reverse directions. This closes the lens aperture 1f, thus completing the exposure operation. Also at this time, the voltage applied to the rocking motor 8 to energize it is only that amount required to maintain the engagement of the tooth 6b with the pawl 7a or 7b.

The driving ring 11 continues to rotate. The rocking motor 8 is de-energized when the driving ring 11 comes into engagement with the engaging portion 3c of the lens setting ring 3. This brings the ratchet 6 out of engagement with the anchor 7. The driving ring 11 further engages with the engaging portion 3c of the ring 3 to rotate the ring 3 in a counterclockwise direction against the biasing force of the spring 4. The lens setting ring 3 is rotated beyond the initial position by the driving ring 11. When the engaged portion 6c of the ratchet 6 comes into engagement with the engaging portion 9a of the engaging lever 9, the lens setting ring 3 is engaged by the engaging lever 9 against the biasing force of the spring 4. Then, the driving ring 11 is rotated again in a clockwise direction and comes to the stop in the initial state shown in FIG. 2. Thus, a series of operations in FIG. 1 is completed.

In the novel structure, when the driving motor 12 is in operation, the voltage applied to the rocking motor 8 is set lower than the voltage applied when the lens setting ring 3 is rotated. Therefore, the voltage applied to the circuit has a low peak value. Consequently, the amount of electric power consumed can be reduced.

What is claimed is:

1. A lens driving device for controlling the position of a lens setting member according to a distance to an object to be photographed, comprising: a lens barrel mounted to undergo movement in the direction of an optical axis; a lens setting member mounted to undergo rotation about the lens barrel and to move the lens barrel in the direction of the optical axis; biasing means for applying a biasing force for biasing the lens setting member in one direction; a ratchet engaging with the lens setting member to undergo rotation therewith, the ratchet being provided with a plurality of teeth on an outer surface thereof; a retaining member having a pair of engaging pawls disposed to alternately engage with the ratchet to prevent rotation of the ratchet due to the biasing force of the biasing means; an electromagnetic actuator; means for applying a first driving voltage to the electromagnetic actuator to maintain the retaining member in an engaged state and applying a second driving voltage to the electromagnetic actuator to rock the retaining member so that the engaging pawls are alternately brought into engagement with the teeth of the ratchet to cause the biasing means to rotate the ratchet in a stepwise manner during periods when the ratchet is not engaged by either of the engaging pawls of the retaining member; and driving means for driving the lens barrel to return to an initial position by rotating the lens setting member to an initial position against the biasing force of the biasing means and for performing at least one of an exposure operation and an aperture control operation; wherein the first driving voltage applied to the electromagnetic actuator is lower than the second driving voltage applied to the electromagnetic actuator such that a lower voltage is applied when the driving member is rotated and the lens setting member is at rest than when the lens setting member is not at rest.

2. A lens driving device according to claim 1; wherein the retaining member is driven to undergo rocking motion such that the ratchet moves a distance equal to half the pitch between adjacent teeth due to the biasing force of the biasing means during time periods in which the retaining member is being alternated from one pawl to the other.

3. A camera lens driving device comprising: a lens driving member biased to undergo rotation in a first direction; a ratchet wheel having a plurality of ratchet teeth and operably rotatable with the lens driving member; a retaining member having pawl portions and being mounted to undergo back and forth rocking movement in which the pawl portions alternately engage the ratchet teeth; and electromagnetic means for controlling the rocking movement of the retaining member and rotational movement of the lens driving member, the electromagnetic means being driven at a lower voltage for maintaining the retaining member in an engaged position than for controlling the rocking movement of the retaining member.

4. A camera lens driving device according to claim 3; further comprising a rotatable movable member which is rotatable in a second direction opposite the first direction to engage and rotate the lens driving member in the second direction.

5. A camera lens driving device according to claim 4; further comprising biasing means for applying a biasing force for biasing the lens driving member in the first direction, the biasing means having a biasing force restored by rotation of the movable member in the second direction.

6. A camera lens driving device according to claim 3; further comprising spring means for biasing the lens driving member in the first direction; and a rotatable movable member rotatable in a second direction opposite the first direction to engage the lens driving member and effect tensioning of the spring means.

7. A camera lens driving device according to claim 6; further comprising a cam on the movable member for effecting an exposure operation when the movable member is rotated back and forth.

\* \* \* \* \*